United States Patent
Adams et al.

(10) Patent No.: US 9,375,679 B2
(45) Date of Patent: Jun. 28, 2016

(54) AIR DRYER ASSEMBLY WITH MANIFOLD SYSTEM

(71) Applicant: HALDEX BRAKE PRODUCTS CORPORATION, Kansas City, MO (US)

(72) Inventors: Andrew W. Adams, Lee's Summit, MO (US); Michael R. Jenkins, Kansas City, MO (US)

(73) Assignee: HALDEX BRAKE PRODUCTS CORPORATION, Kansas City, MO (US)

(*) Notice: Subject to any disclaimer, the term of this patent is extended or adjusted under 35 U.S.C. 154(b) by 75 days.

(21) Appl. No.: 14/014,689

(22) Filed: Aug. 30, 2013

(65) Prior Publication Data

US 2015/0059581 A1   Mar. 5, 2015

(51) Int. Cl.

| | |
|---|---|
| *B01D 53/02* | (2006.01) |
| *B01D 53/26* | (2006.01) |
| *F16L 41/00* | (2006.01) |
| *F16L 41/03* | (2006.01) |
| *B01D 53/04* | (2006.01) |
| *B01D 53/00* | (2006.01) |

(52) U.S. Cl.
CPC .......... *B01D 53/261* (2013.01); *B01D 53/0446* (2013.01); *F16L 41/005* (2013.01); *F16L 41/03* (2013.01); *B01D 53/002* (2013.01); *B01D 53/265* (2013.01); *B01D 2257/702* (2013.01); *B01D 2257/80* (2013.01); *B01D 2258/06* (2013.01); *B01D 2259/402* (2013.01); *Y10T 137/85938* (2015.04)

(58) Field of Classification Search
CPC ........ B01D 53/261; B01D 53/28; F16L 41/00
See application file for complete search history.

(56) References Cited

U.S. PATENT DOCUMENTS

| | | | |
|---|---|---|---|
| 3,967,838 | A | 7/1976 | Legris |
| 4,312,641 | A | 1/1982 | Verrando et al. |
| 4,331,457 | A | 5/1982 | Mörner |

(Continued)

FOREIGN PATENT DOCUMENTS

| | | |
|---|---|---|
| CN | 101219775 | 7/2008 |
| CN | 101863574 | 10/2010 |

(Continued)

OTHER PUBLICATIONS

Heney, Paul J., Drying your compressed air system will save real money. (Pneumatic Systems), Trade Journal, Mar. 1, 2003, 5 pages, Hydraulics & Pneumatics, v 56, n 3, p. 32(5).

(Continued)

*Primary Examiner* — Christopher P Jones
(74) *Attorney, Agent, or Firm* — Stinson Leonard Street LLP

(57) ABSTRACT

An air dryer assembly with manifold system provides increased drying capacity for pressurized air systems, such as vehicle braking systems. A manifold connected to the supply ports of two adjacent air dryers allows parallel flow of air through the separate air dryers. An identical manifold connects to the delivery ports of the two air dryers to combine the clean, dry air from the delivery ports. Similar manifolds connect the control and purge ports of the dryers to allow simultaneous regeneration of the desiccant canisters. An assembly combining two air dryers, two pretreatment units, and manifolds connecting the supply, delivery, control, and purge ports of two air dryers is also disclosed.

16 Claims, 11 Drawing Sheets

(56) References Cited

U.S. PATENT DOCUMENTS

| | | |
|---|---|---|
| 4,581,047 A | 4/1986 | Larsson |
| 4,781,209 A | 11/1988 | Nelander et al. |
| 4,793,380 A | 12/1988 | Lhota |
| 4,806,134 A | 2/1989 | Lhota |
| 4,846,211 A | 7/1989 | Scheffler et al. |
| 4,946,485 A | 8/1990 | Larsson |
| 4,986,899 A | 1/1991 | Parsons |
| 5,002,593 A | 3/1991 | Ichishita et al. |
| 5,057,125 A | 10/1991 | Lankton et al. |
| 5,186,522 A | 2/1993 | Spencer |
| 5,209,764 A | 5/1993 | Eberling |
| 5,228,985 A | 7/1993 | Wells et al. |
| 5,256,251 A | 10/1993 | Holcombe |
| 5,378,266 A | 1/1995 | Elamin |
| 5,427,609 A | 6/1995 | Zoglman et al. |
| 5,429,665 A | 7/1995 | Botich |
| 5,569,316 A | 10/1996 | Flaugher et al. |
| 5,660,607 A | 8/1997 | Jokschas et al. |
| 5,662,727 A | 9/1997 | Castle et al. |
| 5,689,893 A | 11/1997 | Mitsch |
| 5,715,621 A | 2/1998 | Mitsch |
| 5,716,432 A | 2/1998 | Perrine |
| 5,730,172 A | 3/1998 | Rodell et al. |
| 5,901,464 A | 5/1999 | Kazakis et al. |
| 5,961,698 A | 10/1999 | Dossaji et al. |
| 5,983,516 A | 11/1999 | Trapp et al. |
| 6,041,808 A | 3/2000 | Blanz |
| 6,045,197 A | 4/2000 | McGaugh |
| 6,094,836 A | 8/2000 | Mahoney et al. |
| 6,113,869 A | 9/2000 | Jain et al. |
| 6,125,553 A | 10/2000 | Quinn et al. |
| 6,126,724 A | 10/2000 | Martin et al. |
| 6,221,130 B1 | 4/2001 | Kolodziej et al. |
| 6,280,492 B1 | 8/2001 | Binder et al. |
| 6,342,093 B1 | 1/2002 | Larsson |
| 6,484,413 B1 | 11/2002 | Larsson |
| 6,571,489 B2 | 6/2003 | Larsson et al. |
| 6,572,687 B2 | 6/2003 | Slaymaker |
| 6,581,297 B1 | 6/2003 | Ginder |
| 6,581,394 B1 * | 6/2003 | Smolenskiy ............... 62/172 |
| 6,591,518 B2 | 7/2003 | Barberi |
| 6,616,833 B2 | 9/2003 | Lynch |
| 6,695,893 B2 | 2/2004 | Hoffman et al. |
| 6,723,154 B2 | 4/2004 | Olsson et al. |
| 6,743,277 B2 | 6/2004 | Goodell et al. |
| 6,785,980 B1 | 9/2004 | Koelzer |
| 6,824,594 B2 | 11/2004 | Larsson |
| 6,863,019 B2 | 3/2005 | Shamouilian et al. |
| 6,868,866 B2 | 3/2005 | Hear |
| 6,878,194 B2 | 4/2005 | Hoffman et al. |
| 6,929,683 B2 | 8/2005 | Lomax, Jr. et al. |
| 6,951,581 B2 | 10/2005 | Fornof et al. |
| 6,953,498 B2 | 10/2005 | Walker et al. |
| 6,991,001 B2 | 1/2006 | Heer |
| 7,008,472 B2 | 3/2006 | Fornof et al. |
| 7,097,696 B2 | 8/2006 | Salzman et al. |
| 7,100,305 B2 | 9/2006 | Hoffman et al. |
| 7,118,614 B2 | 10/2006 | Welin et al. |
| 7,154,012 B2 | 12/2006 | Lueken et al. |
| 7,194,345 B2 | 3/2007 | Heer |
| 7,279,026 B1 * | 10/2007 | Fresch et al. .................. 95/124 |
| 7,331,592 B2 | 2/2008 | Heer |
| 7,332,017 B2 | 2/2008 | Jain |
| 7,520,922 B2 | 4/2009 | Hoffman et al. |
| 7,608,132 B2 | 10/2009 | Fornof et al. |
| 7,618,481 B2 | 11/2009 | Wu |
| 7,625,437 B2 | 12/2009 | Heer |
| 7,635,409 B2 | 12/2009 | Mahoney et al. |
| 7,870,848 B2 | 1/2011 | Elwart et al. |
| 7,879,138 B2 | 2/2011 | Lee et al. |
| 7,981,194 B2 | 7/2011 | Hoffman et al. |
| 8,118,911 B2 | 2/2012 | Hoffman et al. |
| 8,128,792 B2 | 3/2012 | Hiraiwa et al. |
| 2002/0189456 A1 | 12/2002 | Hoffman et al. |
| 2006/0236558 A1 | 10/2006 | Hoffman et al. |
| 2011/0252966 A1 | 10/2011 | Hoffman et al. |
| 2011/0296809 A1 | 12/2011 | Brotherton et al. |
| 2012/0031273 A1 * | 2/2012 | Heer ............................. 96/116 |

FOREIGN PATENT DOCUMENTS

| | | |
|---|---|---|
| DE | 10 2008 026 103 | 12/2009 |
| EP | 0 197 834 | 3/1986 |
| EP | 0 244 061 | 2/1987 |
| EP | 0 502 826 | 3/1992 |
| EP | 0 884 090 | 1/1998 |
| EP | 0 884 091 | 5/1998 |
| EP | 2 127 727 | 12/2009 |
| JP | 54121458 | 9/1979 |
| JP | 7136458 | 5/1995 |
| JP | 11221423 | 8/1999 |
| WO | WO 00/10857 | 3/2000 |
| WO | WO 2011/026230 | 3/2011 |

OTHER PUBLICATIONS

International Search Report and Written Opinion for related PCT/US2014/053337 dated Dec. 24, 2014.

* cited by examiner

AIR DRYER ASSEMBLY WITH MANIFOLD SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to air dryers, and more specifically to a manifold system for connecting two or more air dryers into a single assembly.

2. Description of Related Art

Pneumatic braking systems are widely used in heavy-duty vehicles such as buses, trucks, and trailers. Such a system typically includes, at a minimum, an air compressor for producing pressurized air, a reservoir for storing pressurized air, and an air dryer for removing moisture and other contaminants from the air flowing through the system.

The air dryer is an essential element of the system as it removes moisture and contaminants that would otherwise degrade the operation of the various components of the braking system. One common type of conventional air dryer includes a dryer body having a removable desiccant cartridge and supply, delivery, and control ports. In normal operation, pressurized system air is directed to the supply port on the dryer body where passageways and an inner chamber formed in the body route the supply air to the desiccant cartridge. The desiccant cartridge traps moisture and other contaminants in solid, liquid and vapor form. From the desiccant cartridge, the clean, dry air flows through the dryer body to the delivery port and on to the remainder of the pressurized air system.

Typical air dryers also operate in a regeneration or purge mode where air is routed in a reverse direction through the desiccant cartridge to expel trapped contaminants and moisture from the cartridge. Applying pressurized air to the control port of the dryer body actuates a purge valve in the dryer body so that air from the system reservoir is directed in a reverse direction through the desiccant cartridge. The reverse flowing air is typically vented through a purge port to the atmosphere along with the previously trapped moisture and contaminants from the desiccant cartridge.

While single air dryers are useful and serve their intended purpose, changes in the industry and changes in maintenance expectations have driven the need for additional air drying capacity. Larger vehicles, for example, typically require correspondingly larger air systems and air dryers. A desire for longer maintenance intervals of the air dryer (i.e., changing the desiccant cartridge less often) likewise requires a dryer having increased capacity.

Various ways of providing increased air drying capacity have been proposed. For example, one approach has been to simply plumb two or more single air dryers into a pressurized air system using a combination of multiple hoses and fittings. This approach has numerous drawbacks, including the relatively large amount of space required to accommodate the arrangement of external hoses and fittings and the overall complexity of the arrangement. Other drawbacks include increased reliability problems introduced by the numerous additional hoses, fittings, and joints, as well as the increased cost associated with the external plumbing and fittings.

Another approach to increasing drying capacity has been to physically increase the size of the air dryer body and/or desiccant cartridge. This approach requires not only the design and manufacture of new parts (e.g., a larger size body and larger size desiccant cartridge), but also increased inventory costs as the new parts must be maintained in inventory along with the existing parts. Furthermore, an increase in size of a desiccant cartridge does not necessarily proportionally increase the drying capacity of the cartridge. Thus a desiccant cartridge that is twice the size does not necessarily double the drying capacity or double the corresponding maintenance interval.

Yet another approach is to provide a unibody air dryer hosting two desiccant cartridges. This approach likewise requires a separate air dryer body part which must be manufactured and maintained in inventory, incurring the detrimental effects as discussed above.

Thus, it can be seen that there remains a need in the art for an air dryer having increased drying capacity.

BRIEF SUMMARY OF THE INVENTION

The present invention is directed to an air dryer assembly having increased drying capacity incorporating a manifold system for use with two or more air dryers. In one aspect, the manifold system of the present invention comprises a supply manifold having an interior passageway fluidly connecting two flow apertures. The flow apertures are connected to the supply ports of two air dryer units with the air dryer units positioned side-by-side. The manifold is secured to the dryers in a manner to provide a fluid flow path from the manifold to the supply ports. A manifold port, preferably positioned along the supply manifold midway between the two flow apertures, allows supply air to be directed into the manifold, through the interior passageway to the supply ports of the two air dryers.

In another aspect of the present invention, the manifold system comprises a delivery manifold having an interior passageway fluidly connecting two flow apertures. The delivery manifold is secured to the dryers in a manner to permit fluid flow through the delivery ports of adjacent air dryer units to the flow apertures of the manifold. Air from the delivery ports of the two air dryer units is directed through the passageway to a manifold port that is preferably positioned midway along the delivery manifold.

In yet another aspect of the present invention the supply manifold and delivery manifold are identical. In yet another aspect, the manifolds are low-profile having a minimal depth from front to back such that the manifolds extend outwardly from the air dryer bodies less than approximately one-fifth of the depth of the air dryer bodies.

In another aspect of the present invention, the supply manifold and delivery manifold have an elongated U-shape configuration that aligns the two flow apertures at the ends of each of the manifolds in a different plane than remainder of the manifold. In this embodiment, one of the supply or delivery manifolds is secured to the dryer bodies with the ends of the manifold extending downwardly and the other manifold is secured to the dryer bodies with the ends of the manifold extending upwardly such that the flow apertures of the supply and deliver manifolds and associated supply and delivery ports are aligned. This particular configuration allows both manifolds to be compactly secured adjacent the dryer bodies without a portion of either manifold blocking connection of the other manifold and without any portion of a manifold extending around, under or above any other portion of a manifold.

In another aspect of the present invention, the manifold system comprises a control manifold comprising an interior passageway connecting two flow apertures. The control manifold is connected to adjacent air dryers in a manner to permit fluid flow through the flow apertures to the control ports of the adjacent air dryers. A manifold port, preferably positioned approximately midway between the flow ports, allows air to be directed into the manifold and to both control ports.

In another aspect of the present invention, the manifold system comprises a purge manifold comprising an interior passageway connecting two flow apertures. The purge manifold is connected to adjacent air dryers in a manner to permit fluid flow from the purge ports of adjacent air dryers to the flow apertures. A manifold port, preferably positioned approximately midway between the flow apertures, allows air to be directed from each of the purge ports, through the manifold and out the manifold port.

In yet another aspect of the present invention, an air dryer assembly comprises first and second air dryers positioned adjacent one another, each comprising an air dryer body and desiccant canister, wherein both air dryers are connected to a common mounting bracket. Two pretreatment units operable to remove oil, water, and large contaminants from the air stream are connected to the same mounting bracket. Manifolds as heretofore described are connected to the air dryers in a manner to permit fluid flow from the manifolds to the respective supply ports, delivery ports, control ports, and purge ports of the adjacent air dryers. A pretreatment manifold connects the output ports of the two pretreatment units, with a hose directing the airstream from the pretreatment manifold to the supply manifold port.

In another aspect of the present invention, any one or all of the manifolds are connected to the adjacent air dryers via connectors having fluid flow passageways formed in the connectors, such as banjo bolts. The connectors secure the manifold to the adjacent air dryers by extending through the flow apertures of the manifold into the respective ports of the air dryers.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF EXEMPLARY EMBODIMENTS

Figure 1:
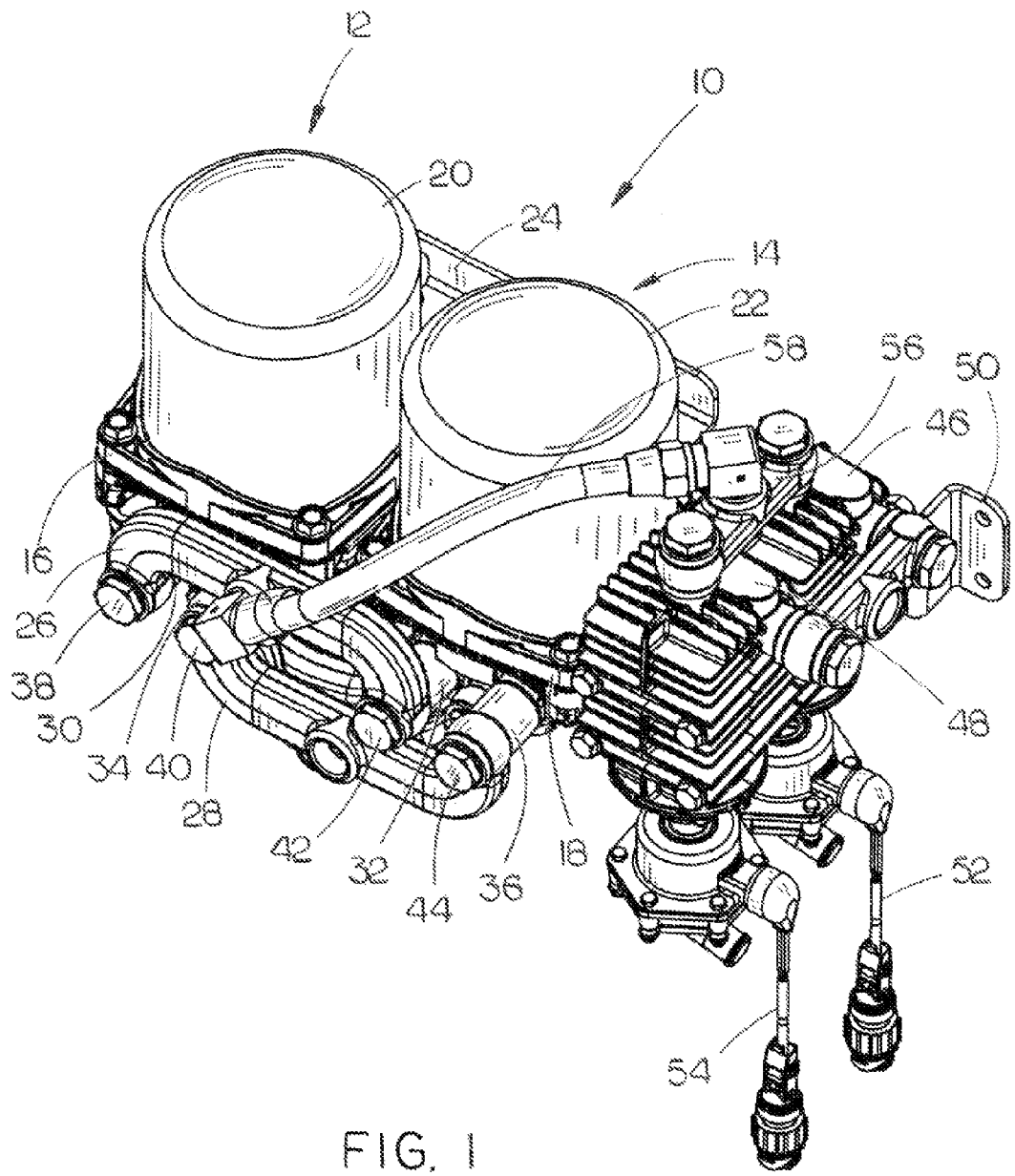
FIG. 1 is a perspective view of an air dryer assembly employing a manifold system in accordance with an exemplary embodiment of the present invention.

An air dryer assembly employing a manifold system in accordance with an exemplary embodiment of the present invention is shown generally in FIGS. 1-4 as numeral 10. Air dryer assembly 10 includes first and second single air dryers 12, 14 positioned adjacent to each other in a side-by-side configuration. Each single air dryer 12, 14 comprises an air dryer body 16, 18, and a desiccant canister 20, 22. As will be explained in more detail below, each dryer body further comprises supply, delivery, and control ports, with internal passageways and an inner chamber for directing the flow of air through the dryer body.

Both single air dryers 12, 14 are attached to a common mounting bracket 24 such that the entire air dryer assembly can be mounted to a bulkhead or other surface in the vehicle. Supply and delivery manifolds 26, 28, each comprising an internal passageway fluidly connecting a center port to flow apertures at opposite ends of the manifold, connect the supply ports 30, 32 and delivery ports 34, 36 of the adjacent single air dryers, respectively. Banjo bolts 38, 40, 42, 44 fluidly connect the airflow apertures at the ends of each manifold 26, 28 to its associated supply or delivery port.

Two pre-treatment units 46, 48 are mounted at one end of the assembly, near second air dryer 14, via bracket 50. Each pretreatment unit is configured to connect to a corresponding input air line 52, 54, with the output of each pretreatment unit connected to a pretreatment output manifold 56. Pretreatment output manifold 56 combines the output from both pretreatment units, with hose 58 directing that output to the center port of supply manifold 26, which is connected to the supply ports of the two single air dryers as described above.

Pretreatment units 46, 48 are preferably condenser/separator units operable to remove oil, liquid, and other large contaminants from the air stream before the stream is introduced into the air dryer. By removing such contaminants upstream, the life of the desiccant in the air dryer is significantly increased. Air enters the pretreatment unit through an inlet port at the side of the unit and expands thereby cooling the air. The cooling of the air causes oil, water, and other contaminants to condense and separate from the air, running to the bottom of the pretreatment unit. The clean air exits the pretreatment unit through an outlet port on the top of the unit. An automatic drain valve at the bottom of the unit operates with each application of the brakes to expel the separated oil, water, and contaminants.

Purge manifold 60 is connected to the purge ports of adjacent single air dryers 12, 14, via banjo bolts 62, 64. A control manifold 66 is similarly connected to the control ports of adjacent single air dryers 12, 14 using banjo bolts 68, 70.

Figure 4:
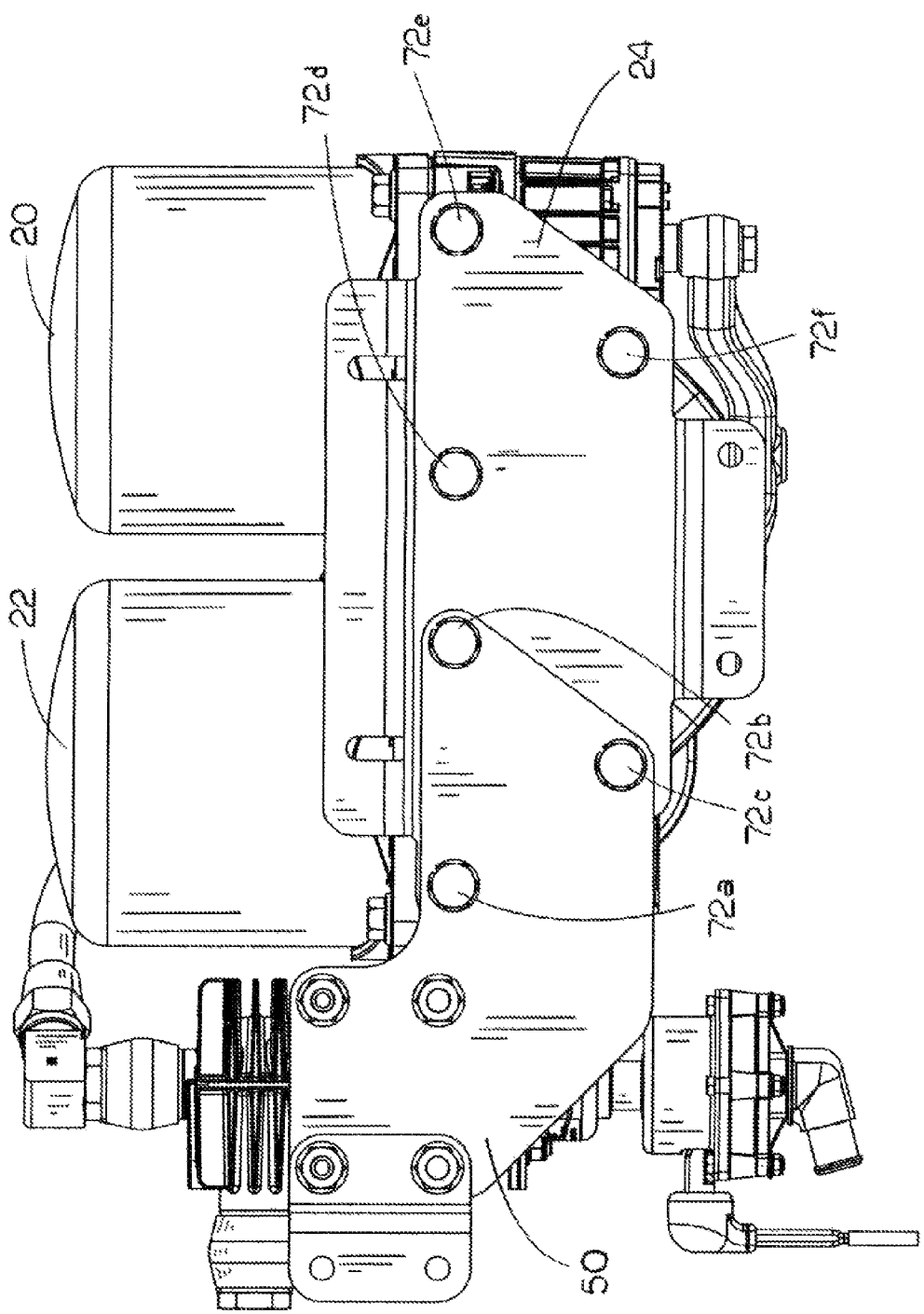
FIG. 4 is a rear view of the air dryer assembly of FIG. 1.

As seen in FIG. 4, three bolts 72a, b, c and 72d, e, f attach each of the air dryer bodies to assembly mounting bracket 24, with each bolt extending through apertures in the bracket and into corresponding threaded mounting holes in the air dryer body. Pretreatment mounting bracket 50 likewise attached to assembly mounting bracket 24. With the air dryers and pretreatment units attached to assembly mounting bracket 24, the entire air dryer assembly can be mounted to fasteners positioned in a bulkhead or other surface using keyhole slots 74, 76 formed in assembly mounting bracket 24. Thus, the entire air dryer assembly can be pre-assembled, with the air dryer bodies, desiccant cartridges, manifolds, and hose attached as described above, and the entire assembly attached into a vehicle as a single unit. Similarly, the entire assembly can be removed from the vehicle for repair or maintenance, or the unit may be left in place while various components are removed—for example, the desiccant canisters may be replaced without dismounting and removing the entire assembly.

As also is apparent in FIG. 4, pretreatment mounting bracket 50 may be oriented in the opposite direction so that the pretreatment units are located at the opposite end of the assembly. Or, a second pretreatment mounting bracket may be used so that a pretreatment unit is mounted at each end of the assembly. These and other variations are within the scope of the present invention.

With the configuration of the air dryer assembly generally set forth, each component and the operation of the assembly will now be described in more detail.

Figure 5:
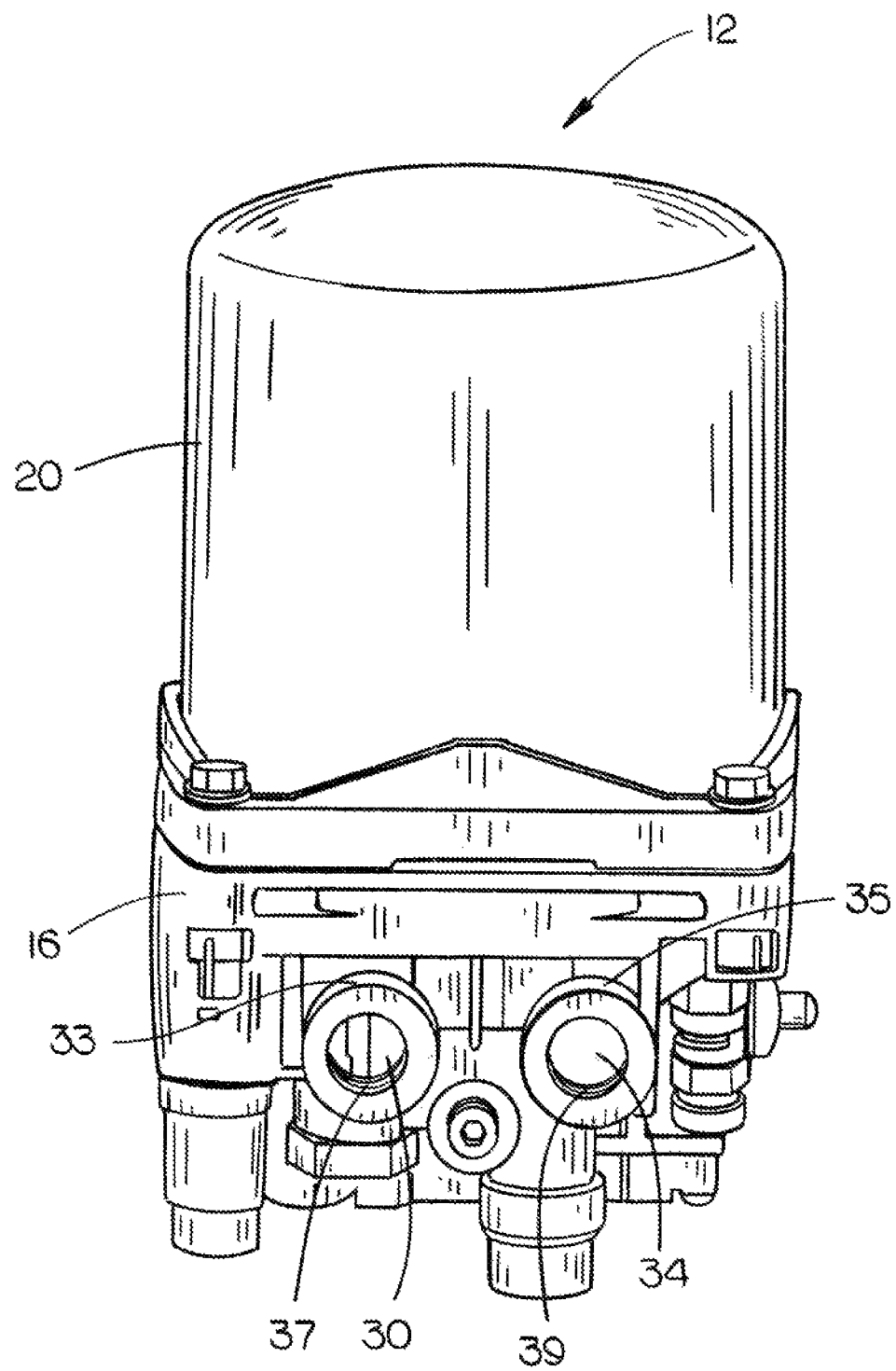
FIG. 5 is a perspective view of an exemplary single air dryer unit of the air dryer assembly of FIG. 1.
Figure 6:
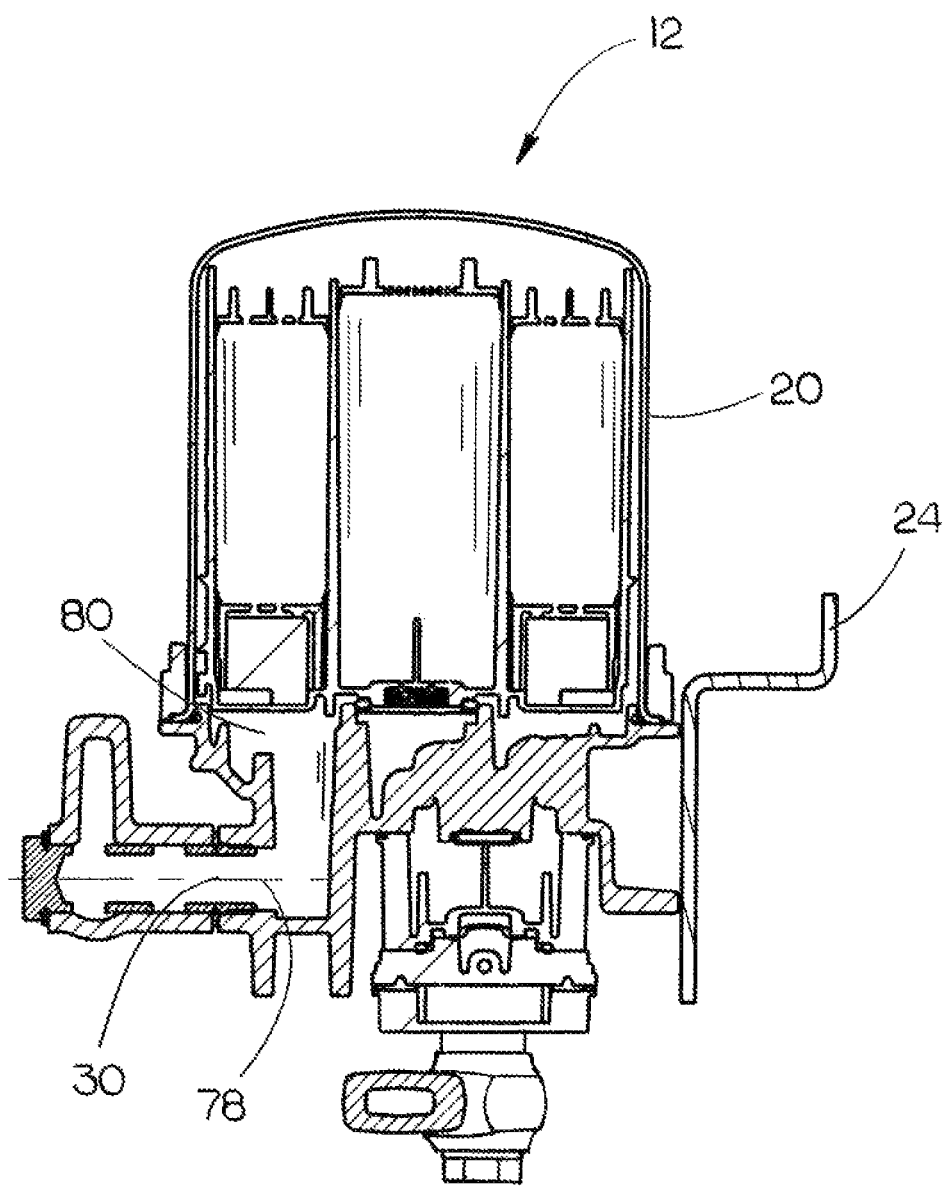
FIG. 6 is a cross-sectional view of the single air dryer unit of FIG. 5 attached in the air dryer assembly of FIG. 1.

Looking to FIG. 5, a representative, exemplary single air dryer 12 comprises a dryer body 16 and desiccant canister 20. Dryer body 16 includes a supply port 30 to receive pressurized air to be dried, and a delivery port 34 to provide dried air for delivery to the brake system. Supply and delivery ports 30, 34 are aligned adjacent one another along the front of dryer body 16. Each of the supply and delivery ports includes a raised boss 33, 35 extending outwardly from the port, with the inner surface 37, 39 of each port being threaded. The ports are thus configured to receive a complementary threaded fitting or fastener to attach and plumb the air dryer into a pressurized air system. As can be seen in the cut-away view of FIG. 6, a single air dryer of the assembly of FIG. 1 comprises a series of internal passageways and an inner chamber for directing and controlling the flow of air through the dryer body. A typical air flow through the air dryer is for air to be received into the supply port 30, directed through a passageway 78 to an inner chamber 80 of dryer body 16, and then into the desiccant canister 20 where the air passes through various materials that remove moisture and other contaminants from the air. Air then flows from the desiccant canister back into the air dryer body where it flows through further passageways in the dryer body to the delivery port and out to the remainder of the system. In the single air dryer depicted, desiccant canister 20 is a replaceable cartridge having at least one desiccant material through which the air passes.

It should be understood that the single air dryer described is exemplary and not limiting, and that the manifold system of the present invention may be equally used with air dryers having other configurations, drying materials, etc.

Figure 7:
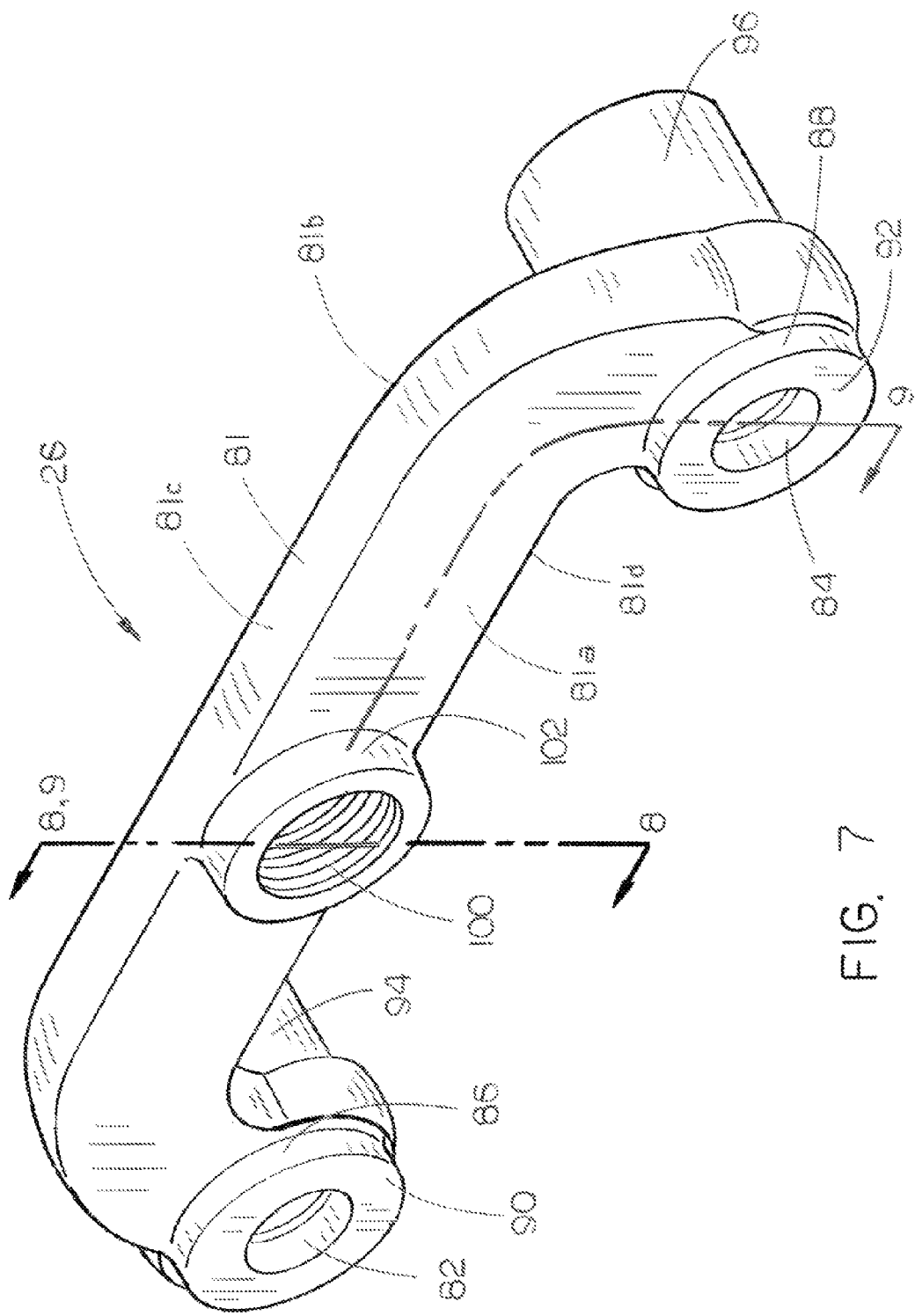
FIG. 7 is a perspective view of a manifold in accordance with an exemplary embodiment of the present invention.

Looking to FIG. 7, a close-up perspective view of supply manifold 26 is depicted. Delivery manifold 28 is identical in structure to supply manifold 26, but, as described hereafter, is oriented differently when secured to the delivery ports. Supply manifold 26 comprises a generally elongated, shallow "U"-shaped body 81 extending between first and second flow apertures 82, 84 located at opposite ends of the manifold. Body 81 has a first side 81a and a second side 81b that are generally parallel to each other. Body 81 has a top 81c and a bottom 81d that each extend between the first side 81a and the second side 81b. The main body of supply manifold 26, including manifold aperture 100, is positioned along a first plane with the ends of the manifold extending downwardly such that flow apertures 82, 84 extend in a second plane. Each of the flow apertures 82, 84 extends through body 81 from first side 81a to second side 81b. A cylindrical boss 86, 88 extends outwardly around each aperture on the front (outward) side of the manifold to provide a mounting and sealing surface 90, 92 for the heads of banjo bolts used to connect the manifold to the air dryer body. A longer cylindrical boss 94, 96 extends rearwardly from the opposite side of each aperture to provide a stand-off and mounting surface for connecting the manifold to the respective ports on the air dryer body.

Figure 8:
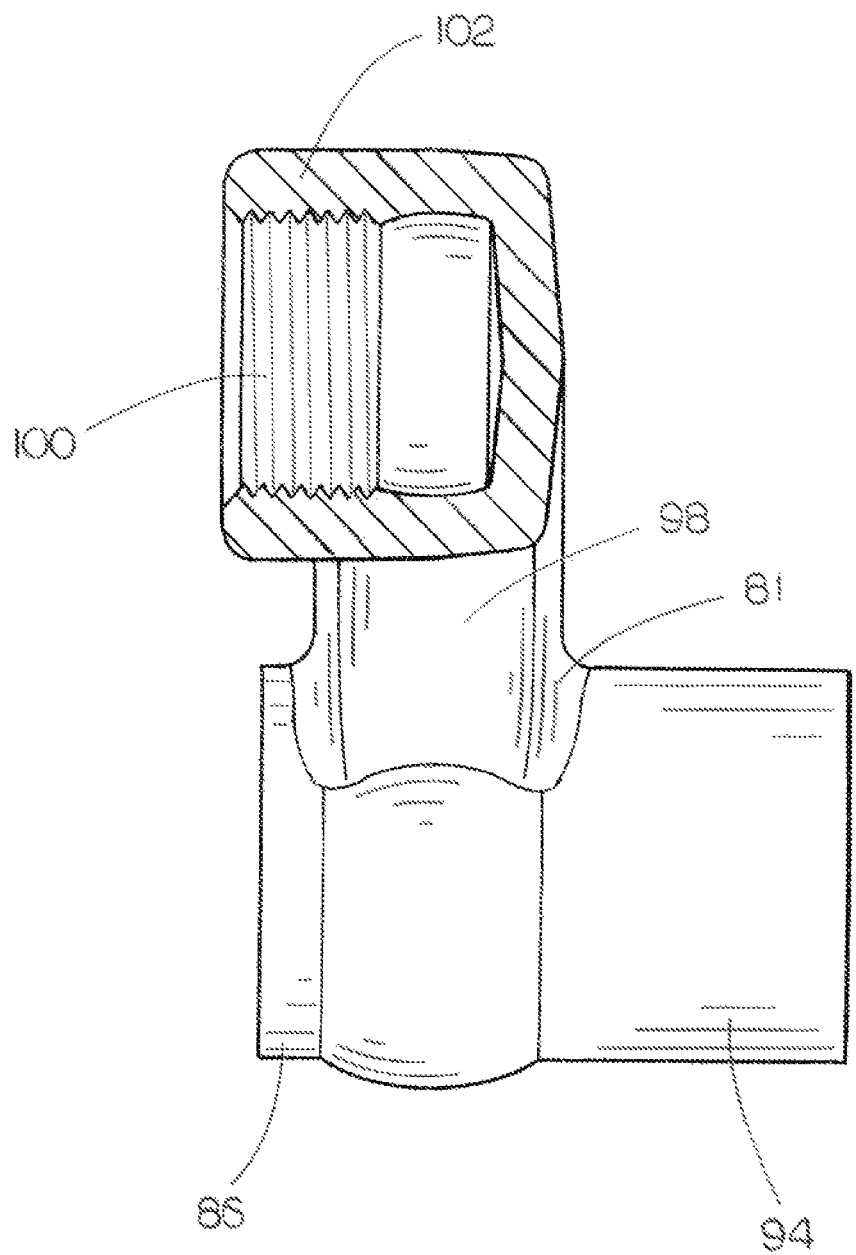
FIG. 8 is an end view of the manifold of FIG. 7.
Figure 9:
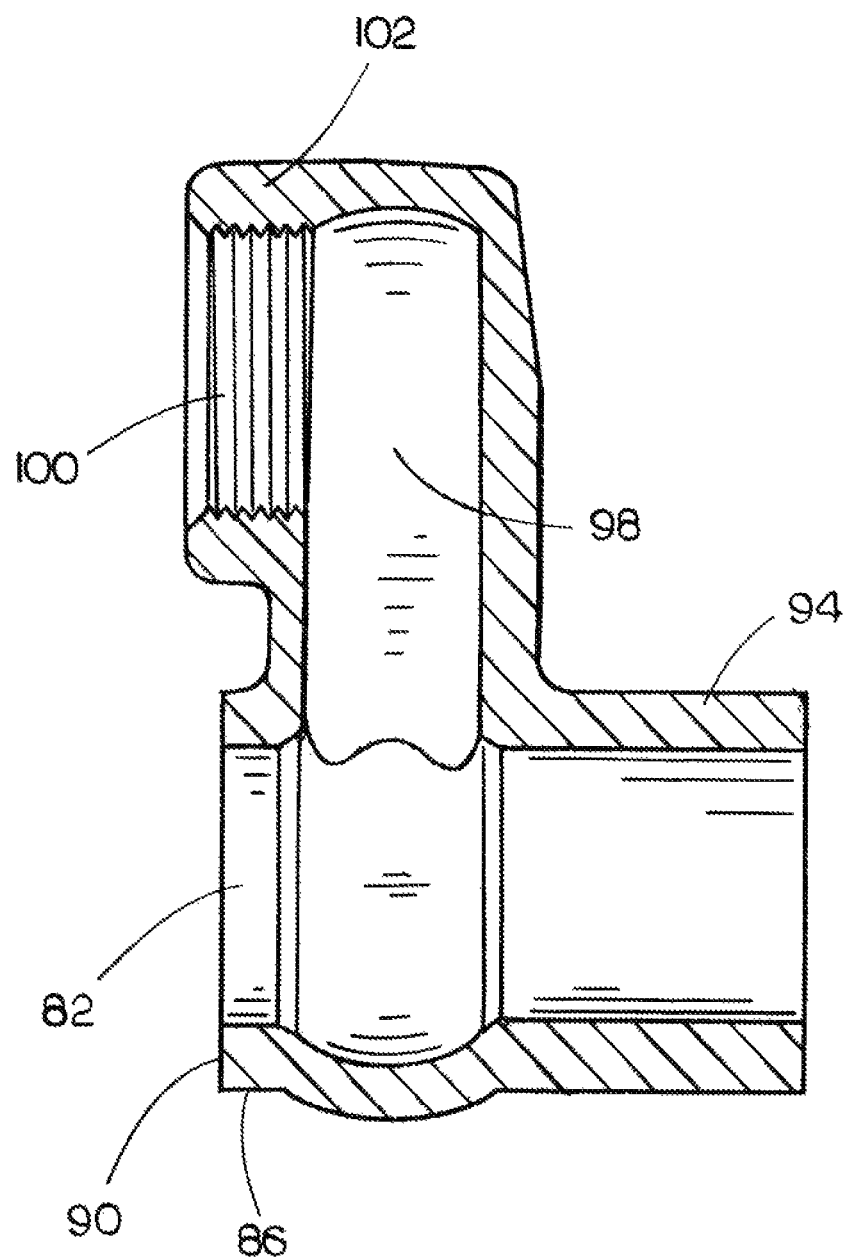
FIG. 9 is a sectional view of the manifold of FIG. 7 showing a uniform internal passageway.

As can be seen in FIGS. 8 and 9, an interior passageway 98 is formed in the body of the manifold, extending the length of the manifold between the two apertures, the passageway having a substantially uniform width and depth along the entirety of its length. The interior passageway 98 has a substantially rectangular cross-section, as shown in FIGS. 8 and 9. A threaded manifold aperture 100 positioned approximately midway along the manifold body provides a fluid connection to interior passageway 98. A raised boss 102 extends outwardly around threaded manifold aperture 100 to provide a surface for connecting a hose or fitting to the port, with complementary threading on hose or fitting engaging with the threads in the aperture port to secure the connection to the manifold. Manifold 26 is preferably formed from a strong, lightweight material such as cast aluminum. Manifold 26 is preferably formed as a "low-profile" manifold having a minimal depth from front to back such that the depth of the installed manifold comprises less than approximately one-fifth of the depth of the air dryer bodies.

Figure 10:
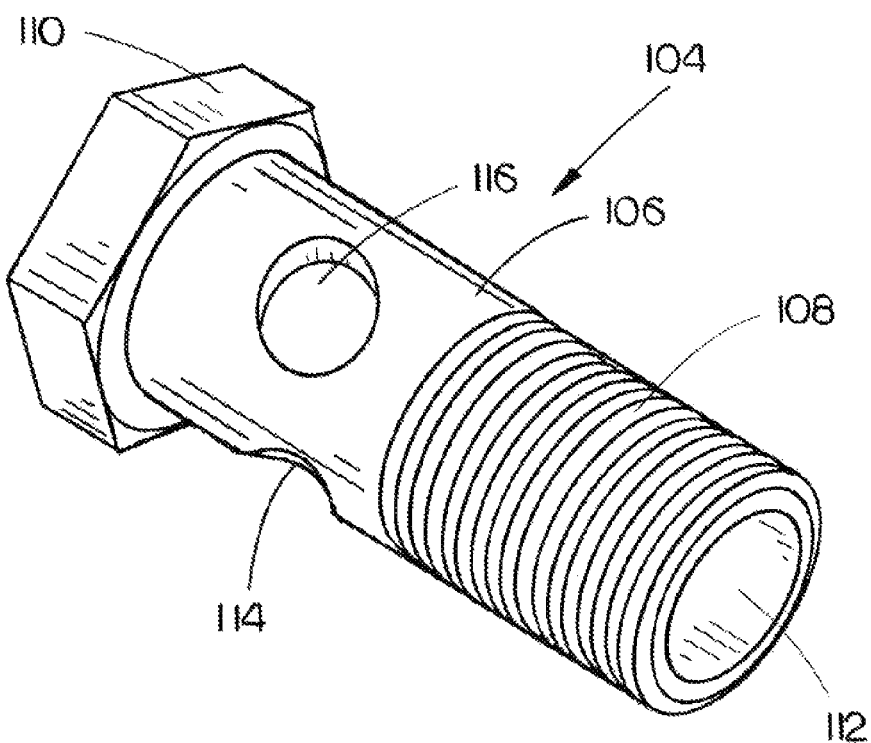
FIG. 10 is perspective view of a banjo bolt used in an exemplary embodiment of the manifold system of the present invention.
Figure 11:
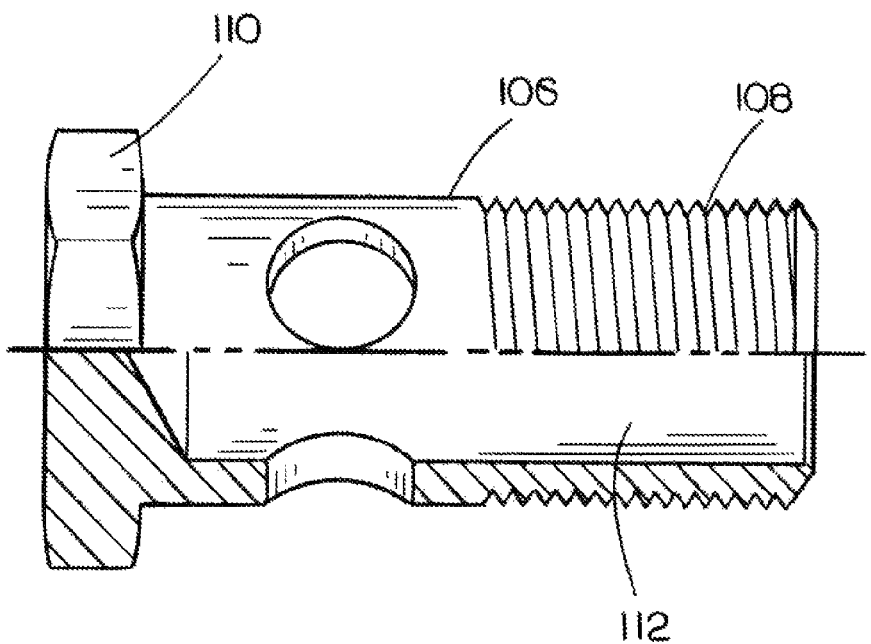
FIG. 11 is a side cut-away view of the banjo bolt of FIG. 10.

Looking to FIGS. 10 and 11, an exemplary banjo bolt 104 used to connect the manifold to the air dryer is depicted. Banjo bolt 104 comprises a generally cylindrical body portion 106 extending between first and second ends, with threads 108 formed along the lower half of the body, and a hex head 110 capping the upper half of the body for attaching and removing the bolt using standard tools. Cylindrical body 106 is hollow, forming a primary passageway 112 extending the length of the body of the bolt. Perpendicular passageways 114, 116 are formed through the body near the head of the bolt, the passageways are spaced equally around the perimeter of the upper portion of the body of the bolt. The cross passageways intersect the primary passageway so that a fluid connection exists between each of the holes and the primary passageway such that air can flow between any or all of those holes and the primary passageway. Banjo bolt 104 is preferably formed from a strong material such as steel.

Looking to the manifold of FIGS. 7-9 in conjunction with the banjo bolts of FIGS. 10 and 11, it can be seen that with banjo bolt 104 inserted into a flow aperture 82, 84 of the manifold 26, at least one of the passageways in the body of the banjo bolt will be in fluid communication with at least a portion of the interior passageway 98 of the manifold. Thus, air flowing through the interior passageway of the manifold will flow into the passageways of the inserted banjo bolt and into the primary passageway of the bolt. With the manifold connected to the ports of two adjacent single air dryers, air introduced into the manifold port will be directed through the passageway to the banjo bolts at opposite ends of the manifold, and then through the banjo bolts into the port to which the bolt is attached. With the manifold port being positioned approximately midway between the ends of the manifold, fluid flow through the manifold port and into the supply and/or delivery ports will be substantially the same resulting in parallel flow.

It should be understood that while a specific configuration of banjo bolt is depicted in conjunction with the exemplary embodiment described herein, other configurations of banjo bolts and of other connectors may likewise be used to attach the manifolds to the air dryers. For example, the banjo bolts may simply include an inner passageway with a single cross passageway or hole, or may include additional cross passageways to fluidly connect to the main passageway. In addition, simple bolts may be used, with a fluid flow between the manifold and the port occurring along a gap between the diameter of the bolt body and/or around the threads of the bolt. Or, a cap having a threaded portion to attach to the port of the air dryer body and secure the manifold may be used. These and other connectors are contemplated by the present invention.

Figure 2:
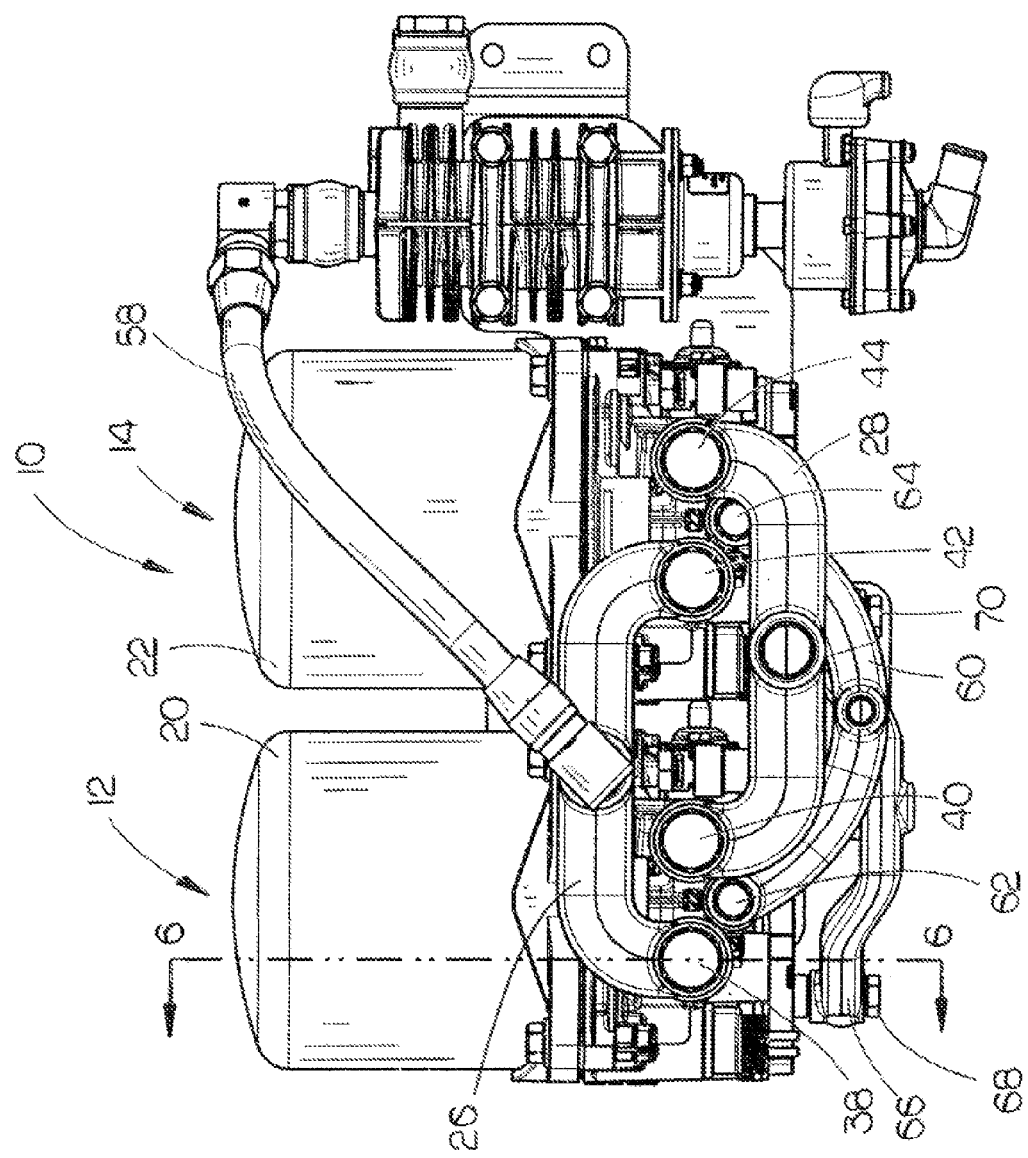
FIG. 2 is a front view of the air dryer assembly of FIG. 1.
Figure 3:
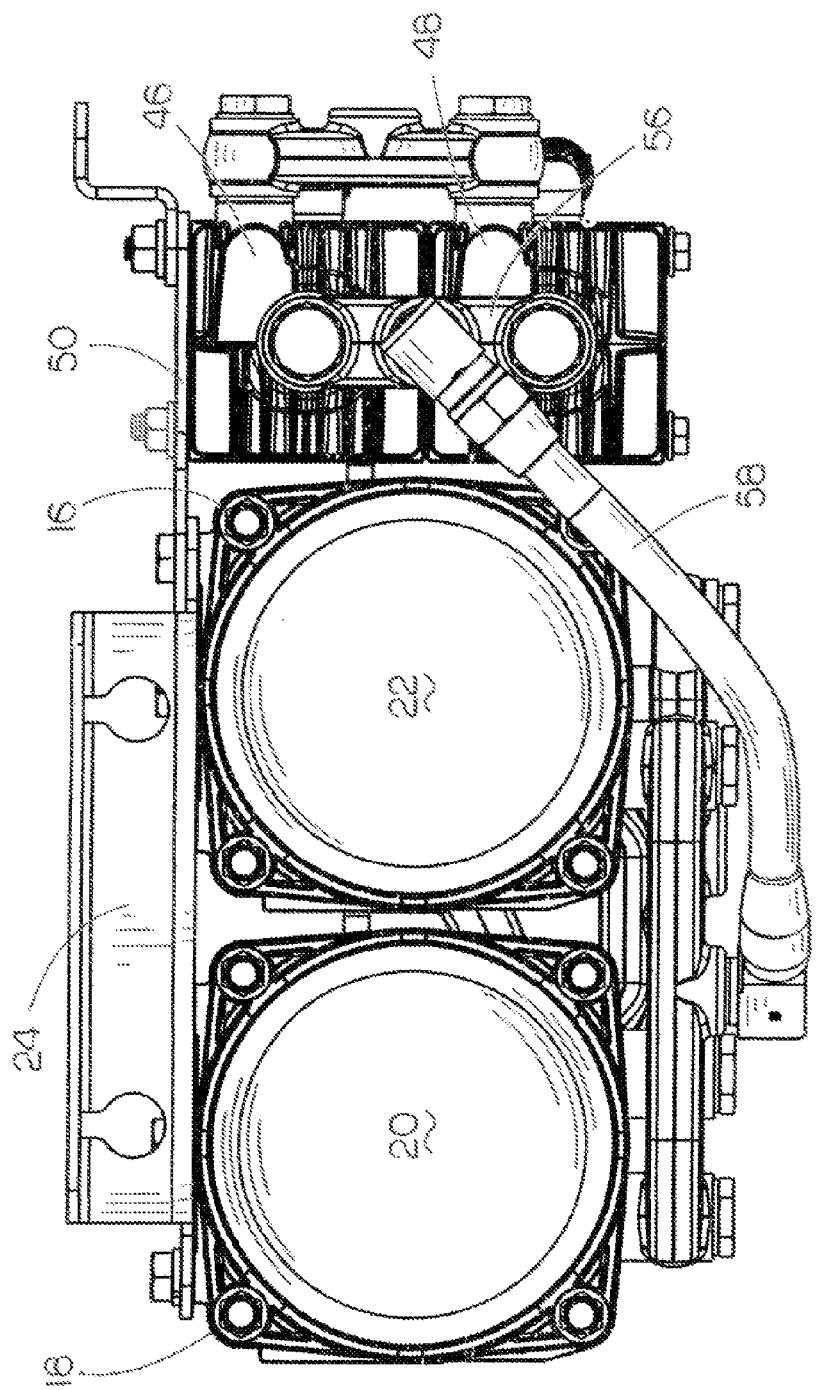
FIG. 3 is a top plan view the air dryer assembly of FIG. 1.
Figure 12:
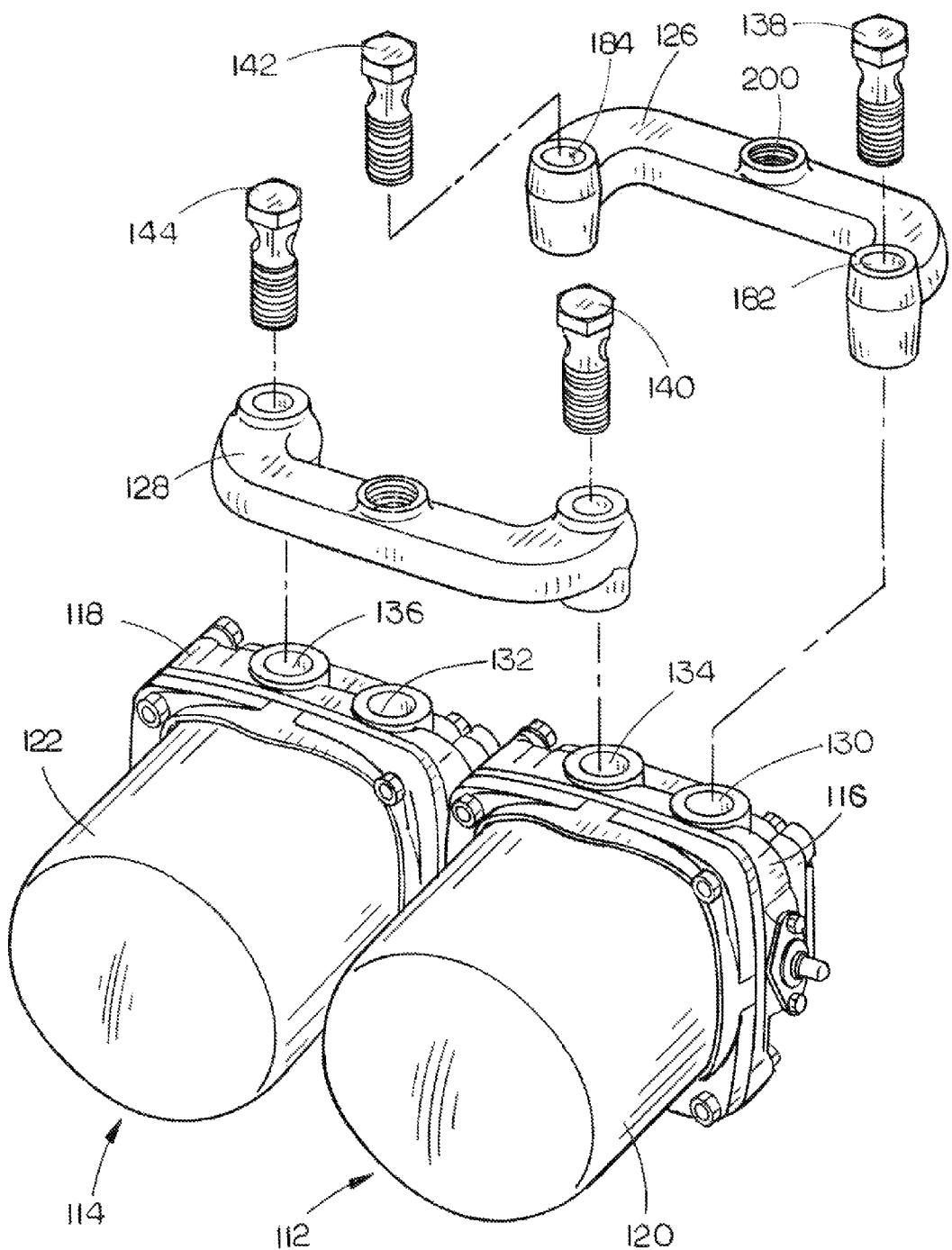
FIG. 12 is an exploded view of an air dryer depicting the supply ports and delivery ports of two single air dryer units connected with a manifold system in accordance with an exemplary embodiment of the present invention.

The airflow arrangement through the manifold, banjo bolts, and flow apertures is explained in more detail in conjunction with the air dryer manifold assembly depicted in FIG. 12. It should be noted that the assembly depicted in FIG. 12 shows an alternative placement of the supply and delivery manifolds, i.e., in the opposite orientation as depicted in the assembly of FIG. 2. Looking to FIG. 12, first and second air dryers 112, 114 are positioned adjacent to each other, in a side-by-side configuration. Each air dryer comprises a dryer body 116, 118 and desiccant canister 120, 122, as previously described. Each air dryer body includes a supply port 130, 132 for introducing air into the dryer, and a delivery port 134, 136, for delivering clean, dry air from the dryer, An elongated "U"-shaped supply manifold 126 as previously described is connected to supply ports 130, 132 so that the flow apertures 182, 184 at opposite ends of the manifold extend upwardly from the main body of manifold 126 to align with the respective supply ports 130, 132 on each of the adjacent air dryers. A banjo bolt 138, 142 extends through each of the flow apertures on the manifold and into the threaded interior of the corresponding supply port 130, 132. With the banjo bolts tightened into the supply ports, the manifold is held in position onto the air dryers, with the head of the banjo bolt sealing against the surface of the boss surrounding each supply port. With the banjo bolts thus attached, the interior passageway of the manifold is in communication with the passageways of the banjo bolts such that air flows freely between the manifold and banjo bolts, into the supply ports and into the air dryer body. The manifold aperture 200 on the supply manifold is thus in communication with both flow apertures/banjo bolts/supply ports so that air introduced into the manifold through the manifold aperture 200 is directed to both single air dryers in which air is directed to the associated desiccant canister and dried as previously described. Because the manifold aperture 200 is positioned approximately at the midpoint of the manifold, and because the interior passageway of the manifold is of substantially uniform depth and width along the length of the manifold, the volume of airflow into the each air dryer is approximately equal, assuming that the air dryer bodies and canisters are essentially identical.

As also depicted in FIG. 12, delivery manifold 128 is similarly connected to delivery ports 134, 136 but in a reverse or mirrored orientation to that of the supply manifold 126. Delivery manifold 128 is connected to delivery ports 134, 136 with flow apertures at opposite ends of the delivery manifold 128 extending downwardly from the main body of the manifold to align with delivery ports 134, 136. Delivery manifold 128 is connected using banjo bolts 140, 144 such that the manifold port is in communication with the manifold passageway, banjo bolts, and delivery ports to enable air from the delivery ports of each air dryer to be communicated through the manifold, banjo bolts and flow apertures.

It should be noted that the identical U-shaped configuration of the supply and delivery manifolds shown in the figures is particularly well adapted for use with air dryer units having supply and delivery ports in horizontal alignment (i.e. where the ports are aligned in the same plane). As shown in FIG. 12, all four ports (two supply, two delivery) fall into a single line or plane, with the supply ports on the two air dryers spaced apart the same distance as the delivery ports on the two air dryers. The identical U-shaped supply and delivery manifolds can be oriented to permit connection of the manifolds to the ports without a portion of one of the manifolds blocking connection of the other manifold, and without any portion of the manifolds extending over, under or around any other portion of the manifolds. In this manner, the manifolds can be compactly secured to the dryers without significantly increasing the overall depth (front to back) of the air dryer assembly. This exemplifies the adaptability of the present invention. While this configuration of manifolds is preferable, the invention described herein is not limited to that specific configuration, and other port arrangements and manifolds, including non-identical manifolds, may be used in accordance with the present invention.

With the configuration and operation of the individual components of the air dryer assembly set forth, the operation of an exemplary embodiment of the air dryer assembly of the present invention will be described with reference back to FIGS. 1-4.

Looking to FIGS. 1-4, two single air dryers 12, 14 are positioned adjacent to each other in a side-by-side configuration. Each single air dryer comprises an air dryer body 16, 18 and a desiccant canister 20, 22. Each air dryer body includes a series of internal passageways and inner chambers for directing the flow of air within the dryer body and through the attached desiccant canister as previously described. The air dryers are attached to a mounting bracket 24 which allows the entire assembly to be attached to a bulkhead or other surface. A pair of pretreatment units 46, 48 is attached to the mounting bracket at the end of the assembly, adjacent second air dryer 18. A purge manifold 56 extends between and attaches to the corresponding outlet ports of each pretreatment unit using banjo bolts.

Looking particularly to FIGS. 1 and 2, a supply manifold 26 extends between, and is attached to, the corresponding supply ports on each of the air dryers using banjo bolts 38, 42. A hose 58, having fittings at each end, connects between the manifold port of the pretreatment manifold 56 and the manifold port of the supply manifold 26.

A delivery manifold 28, identical to the supply manifold but oriented in the opposite direction, extends between, and is attached to, the corresponding delivery ports on each of the air dryers using banjo bolts 40, 44. As previously explained with respect to the exemplary embodiment of FIG. 12, it should be understood that the orientation of the supply and delivery manifolds may be reversed, still in accordance with the present invention.

A purge manifold 60 extends between, and is attached to, the corresponding purge ports on each of the air dryers using banjo bolts, and a control manifold 66 extends between, and is attached to, the corresponding control ports on each of the air dryer using banjo bolts.

With the assembly thus configured, the entire assembly (mounting bracket, air dryers, pretreatment units, manifolds, and hose) can be installed into a vehicle as an integral unit, the mounting bracket 24 attaching to a bulkhead or surface in the vehicle using bolts or other fasteners. Similarly, if necessary, the entire assembly can be removed from the vehicle as an integral unit. Of course, it should be apparent that it is not required that the assembly be handled as an integral unit. For example, the desiccant canisters, manifolds, banjo bolts, and other components may be removed or replaced individually if desired.

Looking still to FIGS. 1 and 2, in operation, pressurized air is routed to the air dryer assembly via input lines 52, 54. Typically the pressurized air originates at an air compressor in the vehicle. Input lines 52, 54 connect to the input port of the respective pretreatment unit via a threaded fitting or connector. As described above, the pretreatment units remove oil, moisture, and large contaminants from the airstream, with the clean air exiting the pretreatment unit through an output port on the top of the unit. Pretreatment manifold 56 is attached to the output ports of the pretreatment units with banjo bolts so that the output air from each pretreatment unit combines in the manifold and exits the manifold into hose 58.

Hose 58 delivers the combined stream of air to supply manifold 26, where the air is directed through the manifold, through the banjo bolts, and into the supply ports 30, 32 of each air dryer 12, 14. In each air dryer, as described above, the air is routed through internal passageways and an inner chamber, and through the desiccant canister. The desiccant canister includes one or more desiccant materials operable to remove moisture and/or contaminants from the air stream. From the desiccant canister, the clean, dry air is routed through the air dryer body and out through the delivery port. Delivery manifold 28, is attached to the delivery ports of both air dryers via banjo bolts, the manifold combines the clean, dry air from both air dryers, the air exits the delivery manifold through the threaded manifold port. In use in a vehicle braking system, a fitting and air hose would be attached to the delivery manifold port to direct the clean, dry air from the delivery manifold to the remainder of the braking system.

Thus, in the exemplary air dryer assembly of the present invention, two single air dryers and two pretreatment units are arranged in close proximity, attached to a common mounting bracket. Low profile manifolds connect to the supply ports and delivery ports of the two single air dryers using banjo bolts. The parallel flow configuration of the two single air dryers doubles the air drying capacity compared to using a single air dryer unit, and correspondingly decreases the wear (and required maintenance) of each of the single air dryer units.

It should be understood that the assembly configuration depicted and described is exemplary, other configurations and assemblies using the manifold and banjo bolts of the present invention are contemplated by the present invention. For example, while the exemplary assembly includes two pretreatment units, those pretreatment units need not necessarily be part of the assembly. An air dryer assembly comprising two single air dryer units with manifolds connecting the supply and delivery ports, with remote location of the pretreatment units is also anticipated by the present invention. Or, two single air dryer units connected via supply and delivery manifolds may be used without any pretreatment units, with the incoming pressurized air routed directly into the supply manifold. Alternatively, a supply manifold may be used to route incoming pressurized air to two single air dryer units, with no delivery manifold—the air from each delivery port being routed to separate areas or with separate hoses. These and other configurations and variations are within the scope of the present invention. In addition, the manifolds may be configured to connect more than two dryer bodies together by adding additional flow apertures to be aligned with corresponding ports on additional dryer bodies.

Looking still to FIGS. 1 and 2, with control manifold 66 connected to the control ports on both air dryers with banjo bolts, a single input through the manifold port will operate the purge valve in each dryer to cause the dryer to operate in regeneration or purge mode as described above. With purge manifold 60 connected to the purge ports of the two single air dryers with banjo bolts, an external purge reservoir can be connected to the purge manifold port so that pressurized air from the reservoir flows back across the desiccant to remove the moisture and contaminants during the purge cycle. The moisture and contaminants are expelled to the atmosphere via the air dryers' exhaust passage.

Thus, the air dryer assembly with manifold system of the present invention provides increased drying capacity for pressurized air systems, such as vehicle braking systems. Low-profile manifolds connected to two adjacent air dryers allow parallel flow of air into the supply ports of the air dryers, and combine the clean, dry air provided through the delivery ports. Similar manifolds connect the control and purge ports of the dryers. Preferably, the supply and delivery manifolds are identical, reducing the cost of separate parts and inventory. The assembly of two air dryers mounted to a single mounting bracket with low profile manifolds connecting the supply and delivery ports provides a compact dryer assembly having increased drying capacity that occupies a minimal volume in a vehicles. With two pretreatment units included in the assembly, the volume of the assembly is significantly reduced as compared to separately mounted air dryers and pretreatment units, and eliminates the associated plumbing and fittings required in such a separate setup.

The manifold system may be used to connect existing air dryers and/or pretreatment units together to increase the air drying capacity of a vehicle without the need for manufacturing larger dryer bodies and/or pretreatment units. In addition, due to the modular nature of the system, the various components of the system (e.g. dryer bodies, desiccant canisters, manifolds and banjo bolts) can be mass produced and individually replaced thereby saving on costs in both the manufacture and maintenance of the system. Thus, the use of existing air dryers further reduces the cost associated with implementing the increased air drying capacity as compared to units requiring specialized air dryer bodies and/or specialized desiccant canisters.

From the foregoing it will be seen that this invention is one well adapted to attain all ends and objectives herein-above set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. An air dryer assembly, comprising:
   a first air dryer comprising a first port and a second port, wherein the first port and the second port are positioned adjacent each other along a front of the first air dryer;
   a second air dryer comprising a third port and a fourth port, wherein the third port and the fourth port are positioned adjacent each other along a front of the second air dryer, and wherein the first air dryer is coupled to the second air dryer in a manner such that the first port and the third port are aligned in a first plane and the second port and the fourth port are aligned in a second plane;

a first manifold comprising a first flow aperture that is aligned with the first port and a second flow aperture that is aligned with the third port, wherein the first manifold comprises a manifold aperture positioned between the first flow aperture and the second flow aperture; and a second manifold comprising a third flow aperture that is aligned with the second port and a fourth flow aperture that is aligned with the fourth port, wherein the second manifold comprises a manifold aperture positioned between the third flow aperture and the fourth flow aperture.

2. The air dryer assembly of claim 1, wherein the first manifold comprises an elongate body comprising a first end and a second end, wherein the body defines an interior passageway extending between the first end and the second end, wherein the first flow aperture is positioned at the first end, wherein the second flow aperture is positioned at the second end, wherein the first flow aperture, the second flow aperture, and the manifold aperture are each in fluid communication with the interior passageway, wherein the first flow aperture and the second flow aperture are each aligned with the first plane, and wherein the manifold aperture is aligned with a third plane.

3. The air dryer assembly of claim 2, wherein the elongate body comprises a first side and a second side, and wherein each of the first flow aperture and the second flow aperture extends through the body from the first side to the second side.

4. The air dryer assembly of claim 3, further comprising a first connector extending through the first flow aperture and into the first port to couple the first manifold to the first air dryer, and a second connector extending through the second flow aperture and into the third port to couple the first manifold to the second air dryer.

5. The air dryer assembly of claim 4, wherein the first connector comprises a fluid flow path that is in fluid communication with the first flow aperture and the first port, and wherein the second connector comprises a fluid flow path that is in fluid communication with the second flow aperture and the third port.

6. The air dryer assembly of claim 1, wherein the first manifold comprises a low-profile cross sectional depth such that the first manifold extends from the first air dryer less than approximately one-fifth of a depth of the first air dryer.

7. The air dryer assembly of claim 1, wherein the first air dryer comprises a first desiccant canister comprising an inlet that is in fluid communication with the first port and an outlet that is in fluid communication with the second port, wherein the second air dryer comprises a second desiccant canister comprising an inlet that is in fluid communication with the third port and an outlet that is in fluid communication with the fourth port.

8. The air dryer assembly of claim 1, further comprising first and second pretreatment units, and a pretreatment output manifold coupled to each of the first and second pretreatment units, wherein the pretreatment output manifold is in fluid communication with the manifold aperture of the first manifold.

9. The air dryer assembly of claim 1, wherein the first manifold and the second manifold are identical.

10. The air dryer assembly of claim 9, wherein the first manifold is oriented at a 180 degree angle relative to the second manifold.

11. The air dryer assembly of claim 1, wherein the first plane is aligned with the second plane.

12. The air dryer assembly of claim 11, wherein the second port is positioned between the first port and the third port, and wherein the third port is positioned between the second port and the fourth port.

13. The air dryer assembly of claim 12, wherein the manifold aperture of the first manifold is positioned above the first port and the third port, and wherein the manifold aperture of the second manifold is positioned below the second port and the fourth port.

14. The air dryer assembly of claim 1, further comprising a mounting bracket attached to each of the first and second air dryer units.

15. The air dryer assembly of claim 1, wherein the first port and the third port are supply ports, wherein the first manifold is a supply manifold, wherein the second port and the fourth port are delivery ports, and wherein the second manifold is a delivery manifold.

16. The air dryer assembly of claim 15, wherein the first air dryer further comprises a control port and a purge port, wherein the second air dryer further comprises a control port and a purge port, and further comprising:

a control manifold having a passageway extending between a first control aperture and a second control aperture, wherein the first control aperture is in fluid communication with the control port of the first air dryer, and wherein the second control aperture is in fluid communication with the control port of the second air dryer; and a purge manifold having a passageway extending between a first purge aperture and a second purge aperture, wherein the first purge aperture is in fluid communication with the purge port of the first air dryer, and wherein the second purge aperture is in fluid communication with the purge port of the second air dryer.

\* \* \* \* \*